Figure 4A:
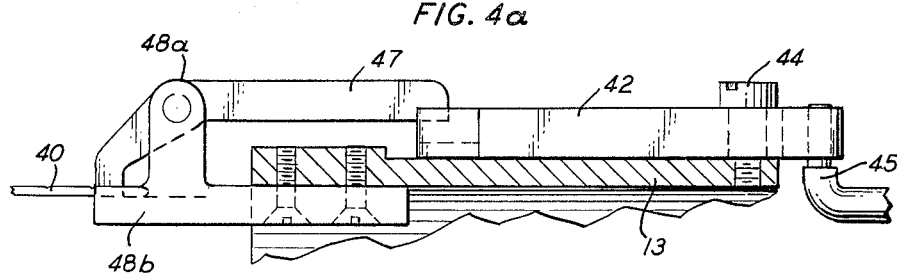

April 5, 1966     L. DOBRJANSKYJ     3,244,853
LOW VOLTAGE AUTOMATIC PERCUSSIVE WELDING HAND TOOL
Filed Dec. 28, 1962     4 Sheets-Sheet 1
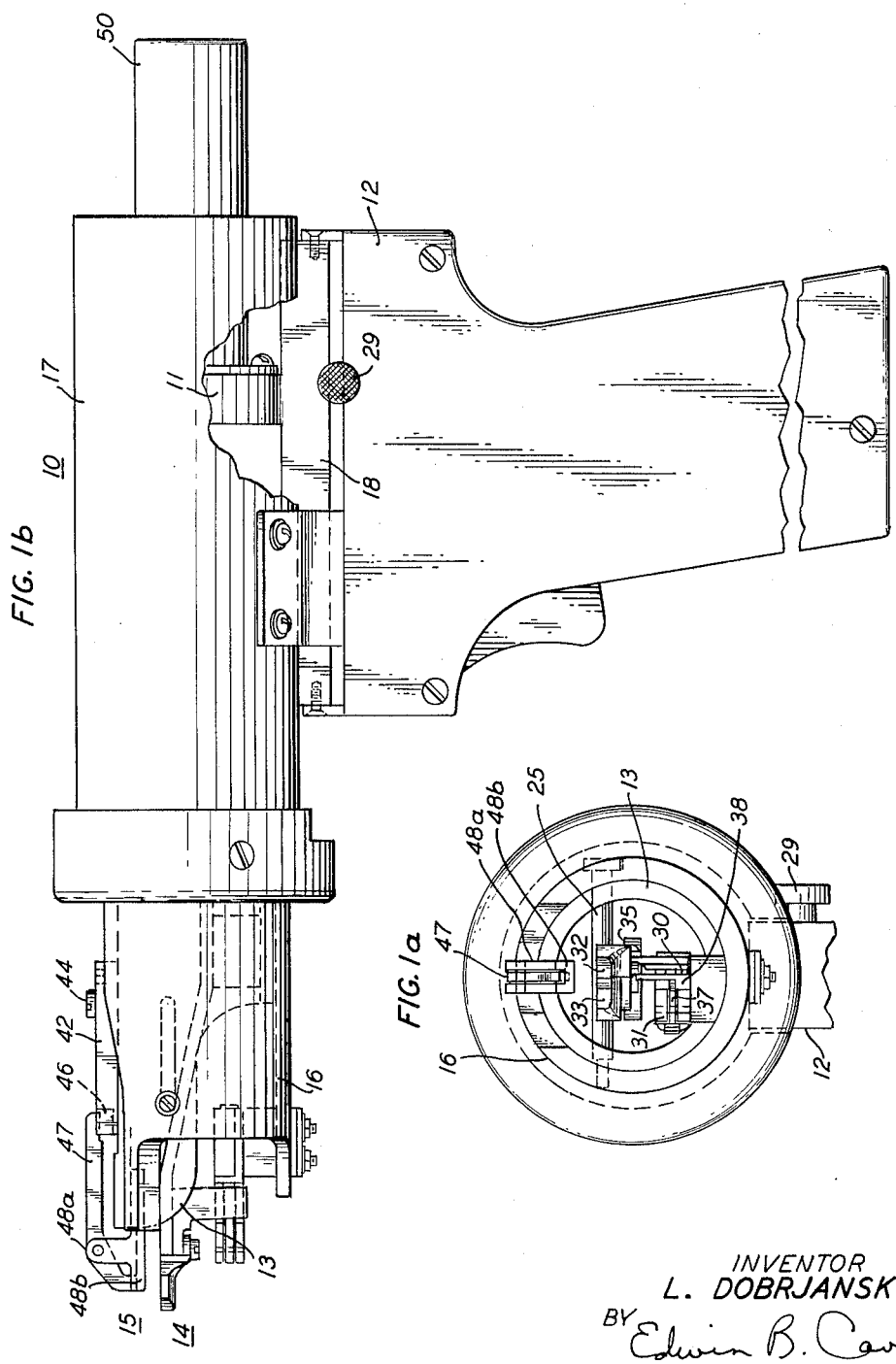
INVENTOR
L. DOBRJANSKYJ
BY Edwin B. Cave
ATTORNEY

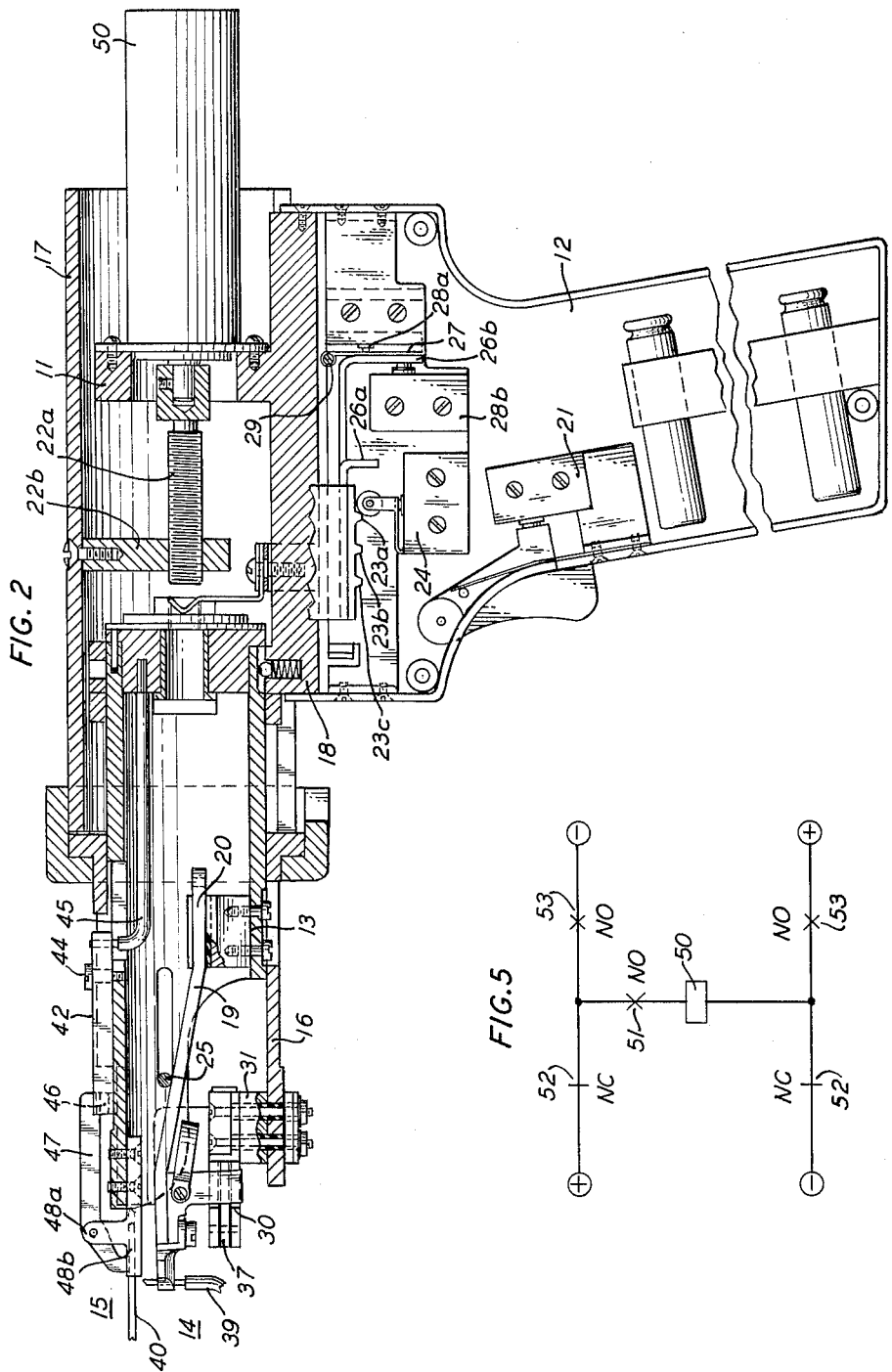

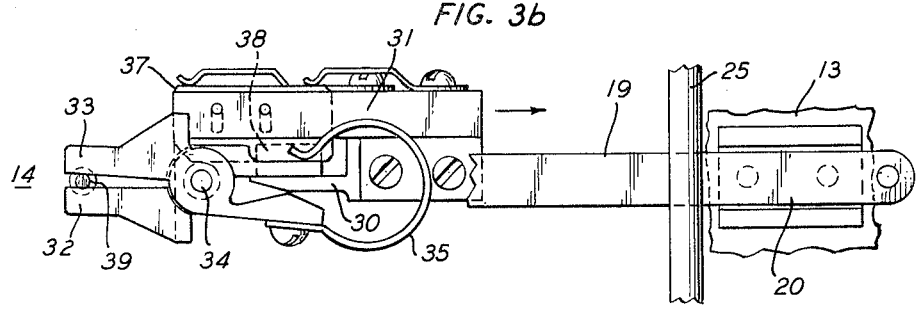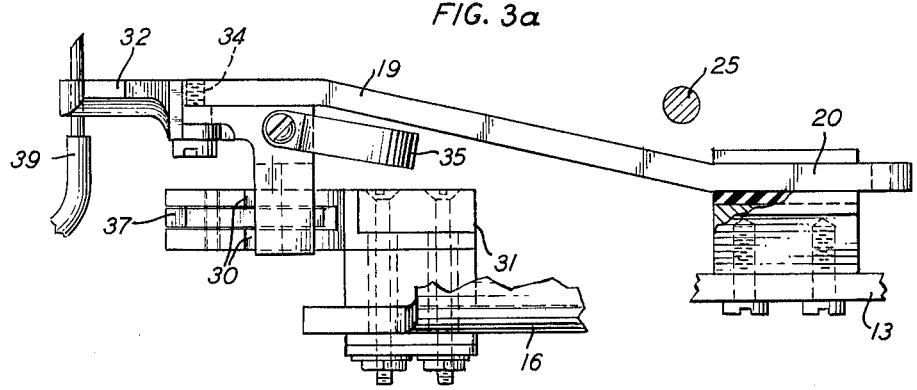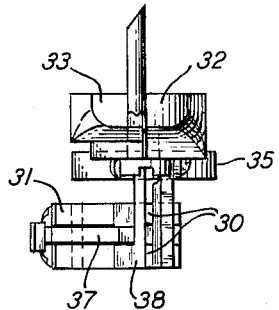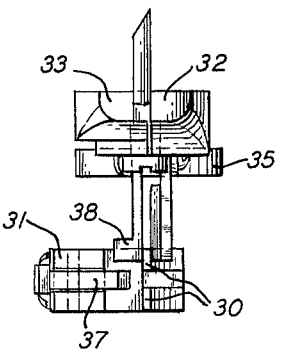

United States Patent Office 3,244,853
Patented Apr. 5, 1966

3,244,853
LOW VOLTAGE AUTOMATIC PERCUSSIVE
WELDING HAND TOOL
Lew Dobrjanskyj, Long Island City, N.Y., assignor to Bell Telephone Laboratories, Incorporated, New York, N.Y., a corporation of New York
Filed Dec. 28, 1962, Ser. No. 247,924
4 Claims. (Cl. 219—95)

This invention relates to percussive welding apparatus and more particularly to automatic hand-operated tools of the so-called gun type which are used for welding a wire to a terminal in an electrically conducting path. This invention is especially concerned with the improvement of such gun-type welding tools.

The kind of automatic welding gun of interest herein is motor driven, trigger operated, and comprises a frame mounted on a handle of the pistol-grip type. The frame includes wire-gripping jaws and terminal-gripping jaws wherein each set of jaws is an electrode. In operation, a wire and terminal are gripped in their respective jaws and then percussively brought together. Since the wire and terminal are electrically conducting and each set of jaws is a separate electrode, as they approach each other an arc is drawn and a weld is made upon impact.

In devices of this kind, the weld usually occurs at an intermediate stage in an operating cycle which comprises the steps of: gripping a wire, gripping a terminal, welding the wire and terminal together, and releasing the welded parts. However, once the operating cycle starts, unless provision for stopping and starting over from an intermediate point is made, a wire and terminal once gripped therein can only be released after they have been joined in a weld. Additionally, it is desirable that the wire-gripping jaws and terminal-gripping jaws be designed to rotate with respect to the gun handle so that an operator will not be forced to assume awkward positions when welding wires to inconveniently placed terminals. Further, the quality of the weld must not vary to an unsatisfactory degree with each welding operation.

Therefore, it is a general object of this invention to improve automatic percussive welding guns.

A specific object of this invention is to improve the manner in which the act of welding is carried out in order to reduce the variation in quality between successive welds.

Still another object of this invention is to enable an operator to stop and return the cycle of operation to the starting condition from any intermediate stage therein.

It is another specific object of this invention to obtain greater operator convenience and efficiency in making welds.

According to one embodiment of this invention, these and other objects are achieved in a hand-operated welding gun wherein two sets of article-gripping jaws are arranged to approach each other with a predetermined velocity during one step in a controlled welding cycle. The jaws are rotatably mounted in the gun and are impelled towards each other by a spring cantilever.

One feature of this invention resides in a slidable, cycle-controlling cam that can be stopped and returned to a start position from any stage in the welding cycle.

Another feature of this invention is an arrangement for improving weld quality whereby the acceleration with which a wire is carried toward a terminal is closely controlled thereby permitting precise control of welding velocities.

Still another feature of this invention resides in an arrangement whereby terminal-gripping jaws can be readily adjusted to more conveniently match any angular orientation in which the terminal to be gripped is mounted.

Other objects and features will appear more fully and clearly in the following description of an exemplary embodiment of this invention which may be taken in connection with the appended drawing in which:

FIGS. 1a and 1b comprise an end view and a plan view of the automatic percussive welding gun embodying the present invention;

FIG. 2 is a side view of the automatic percussive welding gun with various parts in section;

FIGS. 3a, 3b, 3c, and 3d comprise enlarged plan, elevation, and two end views, respectively, of the wire-gripping jaws and the latching and wedging members mounted on the control member;

FIGS. 4a, 4b, 4c, and 4d comprise enlarged plan, elevation, left end and right end views, respectively, of the terminal-gripping jaws and the control surface included on the control member; and FIG. 5 is a schematic diagram of the control circuit.

The welding tool or gun 10, shown in FIGS. 1a and 1b comprises a frame 11 having a handle 12 rigidly fastened thereto. Also mounted on the frame 11 is the support member 13. A pair of jaws 14 for gripping a wire and a pair of jaws 15 for gripping a terminal are mounted on one end of the support member 13 while the other end thereof is fastened rotatably in the frame 11. A cam 16 is mounted slidably on the support member 13 and a slide member 17 is mounted slidably on the frame 11. The cam 16 and the slide member 17 are joined so that the cam 16 is rotatable in the slide member 17. A motor 50 is rigidly mounted on the frame 11. In response to operation of the motor 50, the slide member 17 reciprocates on the frame 11 along the track 18 and the cam 16 reciprocates on the support member 13.

Welding occurs in a cycle of operation comprising the steps of: (1) gripping a wire in the jaws 14, (2) gripping a terminal in the jaws 15, (3) welding the wire to the terminal and, (4) releasing the welded parts. All of the foregoing steps occur in response to movement of the cam 16 as it slides on the support member 13; steps 1, 2, and 3 in response to movement towards the handle 12 and step 4 in response to movement away from the handle 12.

Referring now to FIG. 2, the operating cycle begins with the gun 10 in the start position as shown and ready to grip a wire in the jaws 14. In order to accept a wire therebetween, the jaws 14 have been spread apart, as shown in FIG. 3b, by a wedge member 30 which is part of a movable latch member 31 mounted rigidly on the cam 16, as shown in FIG. 3a. The jaws 14 include two wire grips 32 and 33 joined in scissor fashion by a pivot 34. The wire grips 32 and 33 are urged towards one another by a C-shaped spring 35. Further, the jaws 14 are mounted on the free end of a spring cantilever 19 as shown in FIG. 3a. From FIGS. 2 and 3a it can be seen that the fixed end of the spring cantilever 19 is fastened to the support member 13 in a joint 20. The free end of the spring cantilever 19 can be stressed with a moment of force acting about the joint 20 and can be held in the stressed position by a key 37 which is part of the movable latch member 31. The key 37 engages a lip 38 on the wire grip 32 as shown in FIG. 3c. It can be seen from FIG. 2, that when released, the free end of the spring cantilever 19 will drive a wire gripped in the jaws 14 toward the jaws 15 which are designed for holding a terminal therein.

The operator begins the operating cycle by stripping a wire 39 of its insulation, cutting the tip to a point and holding the uninsulated portion between the wire grips 32 and 33 as shown in FIGS. 3a and 3b. The operator activates the trigger switch 21 which is mounted in the handle 12 as shown in FIG. 2. Activating the trigger switch 21 activates a circuit element to close the contacts 51 shown in FIG. 5. This starts the motor 50 which is mounted on the frame 11 as shown in FIG. 2. The motor 50 turns a threaded member 22a which drives a nut 22b, which is rigidly attached to the slide member 17. As the motor 50 drives the nut 22b, the slide member 17 slides along the track 18 away from the jaws 14 and 15. After hoving a measured distance, the slide member 17 stops when a tooth 23a mounted thereon trips a switch 24. The switch 24 activates a circuit element to open the contacts 51 show in FIG. 5 to stop the motor 50. As the slide member 17 slides, it carries with it the cam 16. As the cam 16 slides, it carries the latch member 31 in the direction indicated in FIG. 3b. When the cam 16 stops, the wedge member 30 has cleared the ends of the wire grips 32 and 33. As a consequence, the C-shaped spring 35 urges the wire grips 32 and 33 together to clamp the stripped wire 39 therebetween. However, although the latch member 31 has moved, it has not moved toward the handle 12 far enough and the key 37 continues to engage the lip 38 on the wire grip 32 as shown in FIG. 3c to hold the spring cantilever 19 in a stressed position.

Figure 4B:
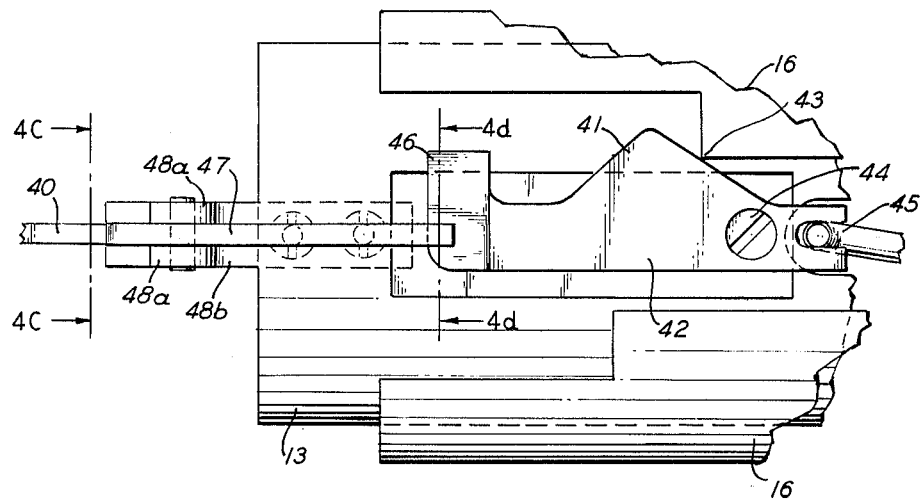
Figure 4C:
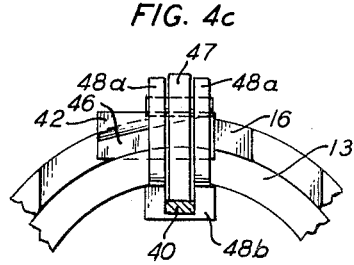
Figure 4D:
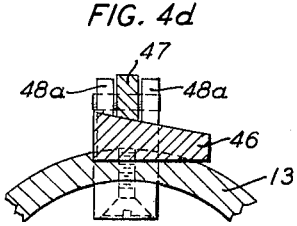

At the conclusion of the first or wire-gripping stage of the operating cycle, the operator starts the second stage by selecting a terminal 40 to which the gripped wire 39 is to be welded. He applies the jaws 15 to the terminal 40 in a standard manner as shown in FIG. 2. With the selected terminal 40 between the jaws 15, the operator activates the trigger switch 21 which, as previously described, starts the motor 50 to drive the cam 16 a measured distance away from the jaws 14 and 15. The cam 16 stops when the tooth 23b trips the switch 24 and stops the motor 50 as hereinbefore described. Reference to FIG. 4b shows how the terminal 40 will be gripped in the jaws 15 as a result of the movement of the cam 16. As the cam 16 slides on the support member 13, a projection 41 on one end of a wedge member 42 follows a control surface 43 defined on the cam 16 as shown in FIG. 4b. The wedge member 42 is pivoted on the support member 13 by a pin 44 and is biased by a spring 45 to urge the projection 41 and a wedge 46 mounted on the wedge member 42 towards the control surface 43. As the wedge 46 moves toward the control surface 43, it engages one end of a clamping member 47 pivoted on the ears 48a of a channel 48b mounted on the support member 13 as shown in FIGS. 4a and 4d. As a consequence, when the cam 16 has moved sufficiently, the spring 45 rotates the wedge 46 under one end of the clamping member 47 and causes the other end to rotate towards the channel 48b, and clamp the terminal 40 therebetween as shown in FIG. 4c.

Therefore, at the end of the second stage in the cycle, the cam 16 has allowed the terminal 40 to be firmly gripped in the jaws 15. Although the latch member 31 has moved, again it has not yet moved far enough towards the handle 12 and the key 37 continues to engage the lip 38 on the wire grip 32 as shown in FIG. 3c, to hold the spring cantilever 19 in the stressed position.

At the conclusion of the second or terminal gripping stage of the cycle of operation everything is in readiness for the third or welding stage. The operator depresses the trigger again which causes movement of the cam 16 as before. Again the cam 16 slides a measured distance away from the jaws 14 and 15 and stops when a tooth 23c trips the switch 24 to stop the motor 50. The consequence of the movement of cam 16 can readily be seen from FIG. 3d. The cam 16 has now carried the key 37 on the latching member 31 beyond the lip 38 and released the spring cantilever 19. The result can be readily understood by reference to FIG. 2 When the spring cantilever 19 is released, it drives the jaws 14 towards the jaws 15. As nothing but air friction, wire drag and internal friction impede spring movement, the jaws 14 are carried towards the jaws 15 at a controlled acceleration. To insure a controllable acceleration, the spring cantilever 19 is made stiff enough to have a latched moment of force large enough to render insignificant the opposing moment of force arising from air friction, wire drag and internal friction. Furthermore, in the latched condition, the spring cantilever 19 has a precise level of potential energy. When released, the potential energy therein converts to kinetic energy. Part of the kinetic energy is dissipated as the jaws 14 accelerate towards the jaws 15 and the remainder is absorbed when the wire 39 percussively engages the terminal 40. When the jaws 14 approach the jaws 15 sufficiently, an arc is drawn between the pointed tip of the wire 39 and the terminal 40 and both begin to melt. During the arc, a melting plane or interface divides the wire 39 into a molten portion and a solid portion and moves along the wire towards the jaws 14 away from the terminal 40. The instantaneous velocity of the melting plane moving away from the terminal 40 initially exceeds the instantaneous velocity of the wire 39 moving toward the terminal 40. However, in order to extinguish the arc, the instantaneous relative velocity of the wire 39 must exceed the instantaneous relative velocity of the melting plane. But if the instantaneous relative velocity of the wire 39 exceeds the instantaneous relative velocity of the melting plane by too wide a margin, the arc will be extinguished before the melting plane has moved beyond the tip of the wire 39 and the completed weld will not include the full cross section of the wire. Therefore, the spring cantilever 19 is latched so as to have a potential energy sufficient to insure that the kinetic energy stored therein at the instant of arc extinction will produce an instantaneous relative velocity of the wire 39 greater than the instantaneous relative velocity of the melting plane. Experiment has shown that, for wires in the range of 19 to 26 gauge copper, the melting plane will be in the full cross section of the wire and a weld can be made at a welding potential of 50 volts delivered from a 750 microfarad capacitor when the relative instantaneous velocity between the wire 39 and the terminal 40 exceeds 80 inches per second at arc extinction. However, the quality of the weld further depends on the manner in which the wire and terminal are percussively engaged. When the arc is extinguished, the wire 39 and the terminal 40 are joined by a puddle of molten metal. The puddle serves as a shock absorber or dash pot to absorb the remaining kinetic energy in the spring cantilever 19. Unexpended kinetic energy is absorbed as the unmelted portion of the wire 39 plunges into the puddle and the puddle spreads out from the point of contact. If the instantaneous relative velocity between the wire 39 and the terminal 40 is too high, as the wire 39 plunges into the puddle, the puddle will splatter and the resulting weld will be poor. Conversely, if the instantaneous relative velocity is too low, most of the arc energy will be expended and the puddle will be too cold to spread well. As a consequence, the kinetic energy of the spring cantilever 19 will be absorbed partially by impact rather than by squeezing of the puddle. It has been found that if the wire 39 enters the puddle with an instantaneous velocity with respect to the terminal 40 in the order of 80 to 100 inches per second, the velocity will be fast enough to insure that the molten metal has not partially cooled, but slow enough to avoid splattering on contact. Rather, the wire 39 entering the puddle at velocities in the aforementioned order will spread the molten material around the contact point in such a manner that the kinetic energy remaining in the spring cantilever 19 will be absorbed as the molten puddle is squeezed. Moreover, the movement of the solid part of the wire 39 into the puddle creates turbulent currents in the molten metal. Such currents cause the crystals of the two materials to intermingle and form a better crystalline interlock in the completed weld.

In addition, the turbulent currents break up the surface oxides present on both materials.

After the weld has cooled, the operator begins the reset stage in the cycle of operation by depressing the trigger switch 21 to move the cam 16 toward the handle as hereinbefore described. Again the cam 16 slides away from the jaws 14 and 15 until a first stop 26a on the side member 17 operates a lever 27 shown in FIG. 2. The lever 27 activates a first limit switch 28a. The first limit switch 28a opens the contacts 52 and closes the contacts 53 as shown in FIG. 5 and thereby reverses the polarity of the motor 50. As a result, the motion of the motor 50 reverses and the cam 16 is driven in the opposite direction towards jaws 14 and 15. As shown in FIG. 2, when the slide member 17 and the cam 16 have returned to the start position, a second stop 26b on the slide member 17 will operate a second limit switch 28b. The operating cycle is reset when the second limit switch 28b stops the motor 50 by opening the contacts 51 and reverses the motor polarity by opening the contacts 53 and closing the contacts 52 as shown in FIG. 5. Furthermore, in the course of returning to its start position, the cam 16 compels each stage in the cycle of operation to return to its initial state as well. For example, after the welding stage has been completed, the jaws 14 have assumed the unlatched position with respect to the latching member 31 as shown in FIG. 3d. To return the jaws 14 to the initial position shown in FIG. 3c, the following will occur: the cam 16, as it slides towards the jaws 14 and the jaws 15, carries with it the latching member 31 and the compressing pin 25 shown in FIG. 2. It can be seen from FIG. 2 or FIG. 3a that the compressing pin 25, when carried far enough, will depress the spring cantilever 19. During the depression of the spring cantilever 19, the lip 38 lines up with and engages the key 37 included in the latching member 31. As the latching member 31 continues to move, the lip 38 forces the key 37 into the body of the latching member 31 against a spring bias. This permits the lip 38 to slide past the key 37 into the latched position shown in FIG. 3c when the spring cantilever 19 has been sufficiently depressed by the compressing pin 25.

Further movement of the latching member 31 in the same direction carries the wedge member 30 between the wire grips 32 and 33 of the jaws 14 and returns them to their initial position by forcing them apart thereby releasing the wire 39 gripped therebetween. Moreover, by reference to FIG. 4, it can be readily understood how the terminal 40 is released from the jaws 15 when the control surface 43 on the sliding cam 16 has engaged the projection 41 and compelled the wedge 46 to rotate and free the clamping member 47 that holds the terminal.

A particular advantage of this invention arises as a result of the manner in which the tool is returned to the starting condition. Although the reset stage has been described as it occurs immediately after the third or welding stage, it can be made to occur at any point in the cycle of operation merely by activating the first limit switch 28a. FIGS. 1a and 1b show a button 29 extending out from the handle 12. From FIG. 2 it can be seen that the shaft of the button 29 is mounted in the end of the lever 27. Since the lever 27 activates the first limit switch 28a, the operator causes the cycle of operation to reset at will merely by pushing the levers against the first limit switch 28a with the button 29.

Another particular advantage gained with this invention is illustrated in FIG. 2. There it can be seen that the jaws 14, the jaws 15 and the cam 16 are mounted on the support member 13. While the jaws 14 and the jaws 15 are fixed rigidly on the support member 13, the cam 16 is mounted slidably thereon. However, the compressing pin 25 is mounted rigidly on the cam 16 through slots in the support member 13. Therefore, it can be seen that rotation of the cam 16 will cause the support member 13 to rotate as well. In turn, the support member 13 has one end mounted rotatably in the frame 11 to which the handle 12 is rigidly attached. As a result, the operator can rotate the slidable cam 16 with respect to the handle 12 and rotatably adjust the jaws 14 and the jaws 15 to an angular position which matches that of any terminal to be welded. This feature provides great convenience and efficiency in the welding operation.

It is to be understood that numerous other modifications of the present invention may be made by those skilled in the art without departing from the spirit and the scope of the present invention.

What is claimed is:

1. In a device for percussively welding a wire to a terminal, the combination comprising:
 a frame;
 a handle mounted rigidly on said frame;
 a slide member mounted on said frame slidably with respect to said handle;
 a support member mounted on said frame rotatably with respect to said handle;
 terminal-gripping jaws mounted rigidly on said support member;
 a spring member having a fixed end fastened to said support member and a free end for impelling a wire carried thereby at a controlled acceleration through a path terminating on a terminal gripped in said terminal-gripping jaws;
 wire-gripping jaws mounted on the free end of said spring member; and
 a cam member mounted on said support member slidable in a first direction and a second direction, one end of said cam member rotatably attached to said slide member and the other end including means for closing said wire-gripping jaws about a wire, means for closing said terminal-gripping jaws about a terminal and means for unlatching said spring member in response to cam member movement in said first direction, and means for opening said wire-gripping jaws from about a wire gripped therebetween, means for opening said terminal-gripping jaws from about a terminal gripped therebetween, and means for depressing and latching said spring member in compression in response to cam member movement in said second direction.

2. A welding tool comprising:
 motor means mounted on a frame;
 a handle rigidly mounted on said frame;
 a slide member mounted on said frame, said slide member being slidable on said frame in response to operation of said motor means;
 a support member mounted on said frame, said support member being rotatable with respect to said handle;
 a hollow cylindrically shaped cam mounted slidably on said support member, said cam being movable in first and second directions on said support member in response to movement of said slide member;
 terminal-gripping means for gripping a terminal in response to cam movement in said first direction and for releasing said terminal in response to cam movement in said second direction;
 a deflectable spring member having a fixed end and a free end, said fixed end being attached to said support member and said free end being movable along a path occupied by said terminal-gripping means when said spring member is deflected and released;
 wire-gripping means for gripping a wire in response to cam movement in said first direction and for releasing said wire in response to cam movement in said second direction, said wire-gripping means mounted on the free end of said spring on said path whereby a wire carried therein will be impelled into percussive engagement with a terminal gripped in said terminal-gripping means in response to the release of said spring;

a latching member mounted on one end of said cam, said latching member for holding said spring member deflected in response to cam movement in said first direction and for releasing said spring member in response to cam movement in said second direction;

and a compressing pin mounted on said cam for deflecting said spring member in response to cam movement in said second direction.

3. In apparatus for percussively welding two articles together the combination comprising:

support means;

first gripping means for holding one of said two articles when closed and for releasing said one article when opened, said first gripping means being mounted on said support means;

second gripping means for holding the other of said two articles when closed and for releasing said other article when opened;

a spring for moving said first and second gripping means apart when deflected and for moving said first and second gripping means toward each other when released, said spring being mounted as a cantilever with one end connected to said support means and the other end connected to said second gripping means;

and a sliding cam mounted on said support means for closing said first and second gripping means and deflecting said spring when moved in one direction and for releasing said spring and opening said first and second gripping means when moved in a reverse direction.

4. A welding tool comprising:

motor means mounted on a frame;

a slide member mounted on said frame, said slide member being slidable on said frame in response to operation of said motor means;

a support member mounted on said frame;

a cam mounted slidably on said support member, said cam being movable in first and second directions on said support member in response to movement of said slide member;

first jaw means for gripping an article in response to cam movement in said first direction and for releasing said article in response to cam movement in said second direction;

a deflectable spring member being mounted as a cantilever and having a fixed end and a free end, said fixed end being attached to said support member and said free end being movable along a path occupied by said first jaw means when said spring member is deflected and released;

second jaw means for gripping a second article in response to cam movement in said first direction and for releasing said second article in response to cam movement in said second direction, said second jaw means mounted on the free end of said spring on said path whereby an article carried therein will be impelled into percussive engagement with an article gripped in said first jaw means in response to the release of said spring;

a latching member for holding said spring member deflected in response to cam movement in said first direction and for releasing said spring member in response to cam movement in said second direction;

and means for deflecting said spring member in response to cam movement in said second direction.

References Cited by the Examiner

UNITED STATES PATENTS

| | | | |
|---|---|---|---|
| 1,993,781 | 3/1935 | Hampton et al. | 219—239 |
| 2,301,652 | 11/1942 | Weisbecker | 219—96 |
| 2,600,779 | 6/1952 | Knosp et al. | 318—286 X |
| 2,843,724 | 7/1958 | De Gaeta et al. | 219—96 |
| 2,874,264 | 2/1959 | Quinlan | 219—95 |
| 2,921,177 | 1/1960 | Gellatly et al. | 219—95 |
| 2,984,733 | 5/1961 | Born | 219—95 X |

RICHARD M. WOOD, *Primary Examiner.*

R. F. STAUBLY, *Assistant Examiner.*